May 10, 1938.  D. H. LAMAR  2,117,181
ANTIGLARE DEVICE
Filed Sept. 13, 1937
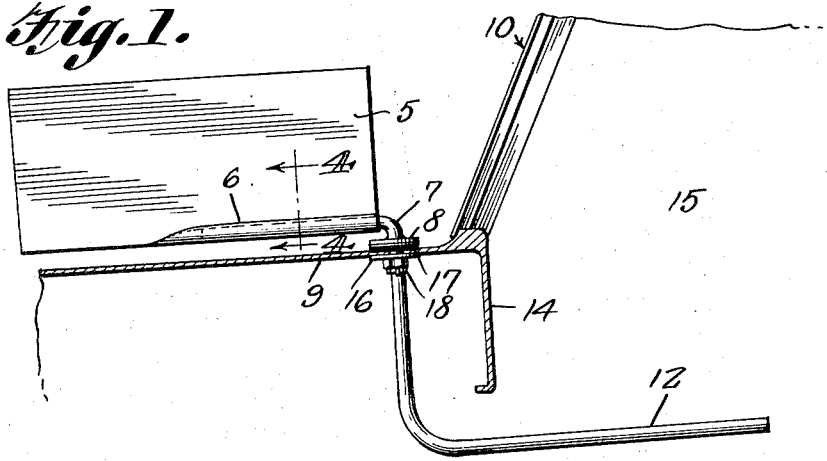
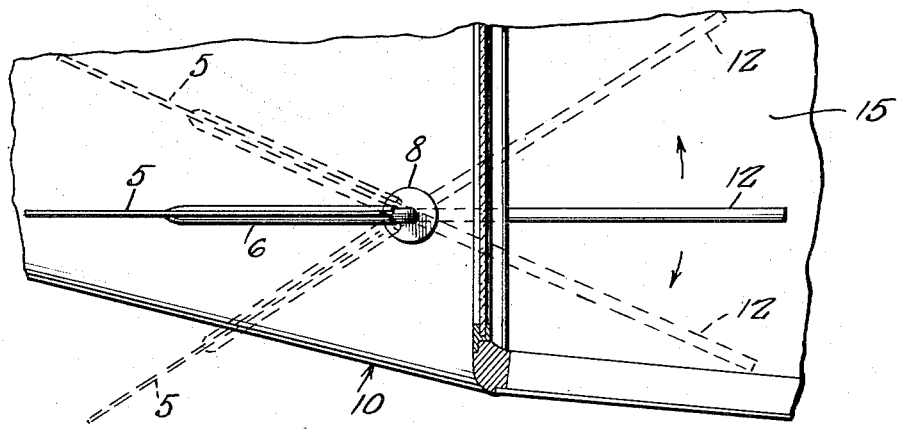
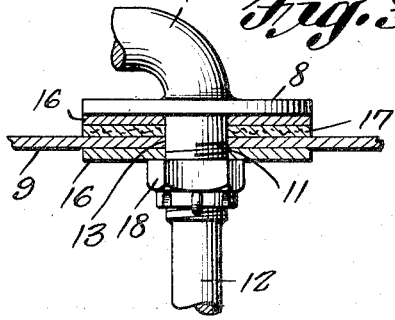
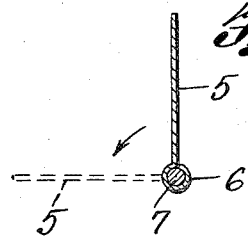
David H. Lamar,
INVENTOR
BY Victor J. Evans & Co.
ATTORNEYS
WITNESS Patented May 10, 1938

2,117,181

UNITED STATES PATENT OFFICE 2,117,181

ANTIGLARE DEVICE

David H. Lamar, Fairmont, W. Va.

Application September 13, 1937, Serial No. 163,663

2 Claims. (Cl. 296—97)

My invention relates to antiglare devices and more particularly to that type used in connection with motor vehicles and the like.

One of the principal objects of my invention is to provide an antiglare device capable of being mounted exteriorly of a motor vehicle body, equipped with means for operating the same from within the body.

Another object of my invention is to provide a device of the above described character which may be readily secured to motor vehicles already in use.

A further object of my invention is to provide a device of the above described character which is efficient in use, easy of operation, simple in construction and economical in manufacture.

Other objects and advantages will be apparent from the following description, appended claims and annexed drawing.

Referring to the drawing wherein like reference characters designate like parts throughout the several views:

Fig. 1 is a side elevation of my invention illustrating the same attached to a section of an automobile.

Fig. 2 is a top plan view thereof.

Fig. 3 is a detail sectional view of the mounting.

Fig. 4 is a sectional view taken on a line 4—4 of Figure 1.

In practicing my invention I provide a rectangular-shaped panel 5 constructed of translucent material, the lower end of which is mounted in a channeled bracket 6 pivotally connected to an inflected arm 7 formed on a collar 8 secured to the cowl 9 of a section of an automobile 10.

An enlarged end 11 of a handle 12 is secured to the collar 8 and extends through an aperture 13 formed in the cowl adjacent the windshield of the automobile. The other end of said handle is angularly disposed and extends under the dash 14 into the passenger compartment 15 whereby said device is operable from within said compartment.

Washers 16 are carried by the enlarged end 11 on opposite sides of the cowl and a gasket 17 is interposed between one of the washers 16 and the upper face of the cowl.

A suitable nut 18 is threaded over the enlarged section 11 and coacts with the collar 8 to clamp the parts together and maintain the device in operating position on the cowl.

In use, the panel is normally maintained in longitudinal alignment with the direction of travel of the automobile. However, when it is desired to prevent the glare of approaching lights from blinding the operator of the automobile the handle 12 is actuated in a direction to move the panel 5 into the line of vision on the side of the approaching lights, thereby enabling the operator to view the line of travel through the translucent panel without being effected by the blinding glare of said lights.

As illustrated in dotted lines in Figure 2 of the drawing, the panel 5 may be actuated to be positioned on either side of the operator whereby the operator may view either side of the line of travel, as the case may be.

In instances where it is desired not to utilize the device for viewing a line of travel, for instance in the daytime, the panel 5 may be pivoted downwardly to assume a horizontal position out of the line of vision of the operator as illustrated in dotted lines in Figure 4.

What I claim is:

1. A device of the character described, comprising, a bracket, a panel of antiglare material secured to said bracket and movable therewith, a horizontally extending arm adjustably connected to said bracket whereby to permit adjustment of said panel to horizontal and vertical positions relative to said arm and fashioned with a depending end section adapted for pivotable mounting on the cowl of a motor vehicle, and a handle having an upwardly extending end section secured to said depending end section of the arm and an angularly disposed section adapted to extend within the passenger compartment of said motor vehicle whereby to operate said panel from within said compartment in vertical disposed position into and out of the line of vision of a person within said compartment.

2. A device of the character described, comprising, in combination, a motor vehicle having a passenger compartment and a cowl extending forwardly thereof, a bracket extending over said cowl, a panel of antiglare material secured to said bracket and movable therewith, a horizontally extending arm adjustably connected to said bracket in a manner to permit adjustment of said bracket and said panel to horizontal and vertical positions relative to said cowl, said arm fashioned with a depending end section formed with a collar supported on said cowl, a handle having an upwardly extending end section extending through said cowl and secured to said collar and an angularly disposed section extending within said compartment and operable therefrom, and a member carried by said upwardly extending section of the handle and coacting with said collar to pivot said arm to said cowl whereby to permit rotation of said panel in vertical position horizontally across said cowl and into and out of the line of vision of a person within said compartment.

DAVID H. LAMAR.